(12) United States Patent
Beckwith et al.

(10) Patent No.: US 7,705,057 B2
(45) Date of Patent: Apr. 27, 2010

(54) AQUEOUS DISPERSION OF POLYMERIC MATERIAL AND SURFACE ACTIVE AGENT AND USE THEREOF

(75) Inventors: Ian John Beckwith, Leeds (GB); John Robinson, Thornton Cleveleys (GB)

(73) Assignee: Victrex Manufacturing Limited (GB)

( * ) Notice: Subject to any disclaimer, the term of this patent is extended or adjusted under 35 U.S.C. 154(b) by 0 days.

(21) Appl. No.: 10/571,225

(22) PCT Filed: Aug. 31, 2004

(86) PCT No.: PCT/GB2004/003710

§ 371 (c)(1),
(2), (4) Date: Nov. 13, 2006

(87) PCT Pub. No.: WO2005/023893

PCT Pub. Date: Mar. 17, 2005

(65) Prior Publication Data

US 2007/0112109 A1    May 17, 2007

(30) Foreign Application Priority Data

Sep. 5, 2003    (GB) ................... 0320834.5

(51) Int. Cl.
*B01F 3/12* (2006.01)
*C08G 8/02* (2006.01)
*C08G 14/00* (2006.01)
*C08G 8/26* (2006.01)

(52) U.S. Cl. ................ 516/77; 528/86; 528/125; 528/126; 528/127; 528/128

(58) Field of Classification Search ............... 528/86, 528/125–128; 525/86; 516/77
See application file for complete search history.

(56) References Cited

U.S. PATENT DOCUMENTS

| | | | | |
|---|---|---|---|---|
| 3,956,313 A | * | 5/1976 | Freyermuth et al. | 548/551 |
| 3,984,604 A | * | 10/1976 | King et al. | 428/422 |
| 3,993,843 A | | 11/1976 | Vasta et al. | |
| 4,021,395 A | * | 5/1977 | Vary | 524/609 |
| 4,131,711 A | * | 12/1978 | Attwood | 428/332 |
| 4,167,605 A | * | 9/1979 | Attwood et al. | 428/419 |
| 4,228,219 A | * | 10/1980 | Hoy et al. | 428/422 |
| 4,296,217 A | * | 10/1981 | Stuart-Webb | 525/390 |
| 4,745,167 A | * | 5/1988 | Iizuka et al. | 526/262 |
| 4,778,836 A | * | 10/1988 | Farrar et al. | 524/35 |
| 4,981,882 A | * | 1/1991 | Smith et al. | 523/205 |
| 5,840,804 A | * | 11/1998 | Carl et al. | 524/555 |
| 5,910,558 A | * | 6/1999 | Schoenherr et al. | 528/125 |
| 5,997,741 A | * | 12/1999 | Shimoda et al. | 210/500.27 |
| 6,156,835 A | * | 12/2000 | Anderson et al. | 524/445 |
| 6,228,932 B1 | * | 5/2001 | Saito | 524/502 |
| 6,287,992 B1 | * | 9/2001 | Polansky et al. | 442/59 |
| 6,398,862 B1 | * | 6/2002 | Hechler et al. | 106/404 |
| 6,512,076 B2 | * | 1/2003 | Lee et al. | 528/171 |
| 6,602,333 B2 | * | 8/2003 | Miyabayashi | 106/31.27 |
| 6,638,621 B2 | * | 10/2003 | Anderson | 428/402.24 |
| 6,828,414 B2 | * | 12/2004 | Okamoto et al. | 528/425 |
| 2003/0044619 A1 | * | 3/2003 | Leech et al. | 428/421 |
| 2003/0220462 A1 | * | 11/2003 | Porzio et al. | 528/44 |
| 2004/0086666 A1 | * | 5/2004 | Yoshimura et al. | 428/32.1 |
| 2004/0266932 A1 | * | 12/2004 | Mosquet et al. | 524/436 |
| 2005/0025725 A1 | * | 2/2005 | Schultz et al. | 424/59 |
| 2005/0032833 A1 | * | 2/2005 | Kwiatkowski et al. | 514/312 |
| 2006/0122322 A1 | * | 6/2006 | Chrisstoffels et al. | 524/804 |

FOREIGN PATENT DOCUMENTS

| | | |
|---|---|---|
| DE | 300 235 A | 10/1990 |
| DE | 43 01 543 A1 | 7/1994 |
| GB | 1 588 161 A | 4/1981 |
| JP | 05345829 A * | 12/1993 |

OTHER PUBLICATIONS

Machine translation of JP 05-345829 A (2008).*
Aerosol OT surfactants, Cytec, 2000.*
Patent Abstract of Japan, vol. 018, No. 191 (C-1186), Apr. 4, 1994 & JP 05 345829 A, Dec. 27, 1993.

* cited by examiner

*Primary Examiner*—Mark Eashoo
*Assistant Examiner*—Liam J Heincer
(74) *Attorney, Agent, or Firm*—Fay Sharpe LLP

(57) ABSTRACT

An aqueous dispersion comprises:
(A) water;
(B) a polymeric material of a type which includes:
  (a) phenyl moieties;
  (b) carbonyl and/or sulphone moieties; and
  (c) ether and/or thioether moieties;
(C) a surface active agent which includes a carbonyl or sulphone moiety and a hydrophilic group.

Preferred embodiments relate to polyketones in combination with surfactants which are alkyl sulphosuccinates.

36 Claims, No Drawings

AQUEOUS DISPERSION OF POLYMERIC MATERIAL AND SURFACE ACTIVE AGENT AND USE THEREOF

This invention relates to a dispersion and the use thereof. Particularly, although not exclusively, the invention relates to an aqueous dispersion which includes a polyaryletherketone or sulphone polymer or copolymer and the use thereof in the coating of substrates.

Polyaryletherketone and sulphone polymers or copolymers can be more difficult to apply as coatings to substrates compared to many other functional coatings. This is often due to a combination of high processing temperatures, low resin elongation and rapid crystallisation kinetics. For example, polyetheretherketone melts at 340° C. and has a processing temperature range from 380° C. to 400° C. Substrates for receiving polyetheretherketone coatings must be able to stand such processing temperatures for at least an hour. Furthermore, substrates must not out-gas or form loose or brittle surface oxides.

It is known in the context of polymeric materials other than polyaryletherketone or sulphone polymers or copolymers to form aqueous dispersions of polymeric materials and to use such dispersions to form coatings on substrates. However, polyaryletherketones and sulphones cannot readily be dispersed in water and used in coatings.

Applicant is unaware of any commercially available aqueous dispersion of polyaryletherketone or sulphone polymers or copolymers and/or the use of such a dispersion in coating of substrates.

It is an object of the present invention to address the above described problem.

According to a first aspect of the invention, there is provided an aqueous dispersion comprising:
(A) water;
(B) a polymeric material of a type which includes:
  (a) phenyl moieties;
  (b) carbonyl and/or sulphone moieties; and
  (c) ether and/or thioether moieties;
(C) a surface active agent which includes a carbonyl or sulphone moiety and a hydrophilic group.

It is believed that the carbonyl or sulphone moiety of the surface active agent may interact with the carbonyl and/or sulphone moieties of the polymeric material thereby to compatibilise the polymeric material and surface active agent; and then the hydrophilic group of the surface active agent compatibilises the polymeric material/surface active agent with the water.

Preferably, said polymeric maternal has a moiety of formula

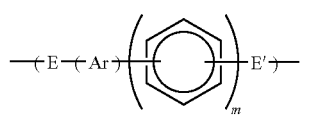

and/or a moiety of formula

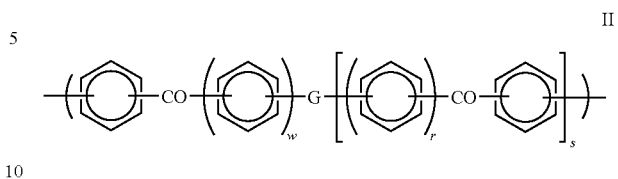

and/or a moiety of formula

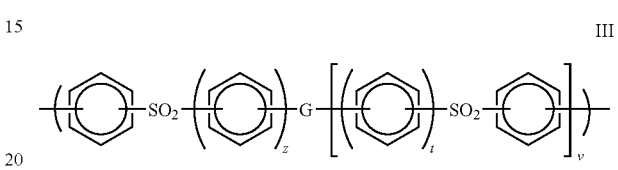

wherein the phenyl moieties in units I, II, and III are independently optionally substituted and optionally cross-linked; and wherein m,r,s,t,v,w and z independently represent zero or a positive integer, E and E' independently represent an oxygen or a sulphur atom or a direct link, G represents an oxygen or sulphur atom, a direct link or a —O-Ph-O— moiety where Ph represents a phenyl group and Ar is selected from one of the following moieties (i)*, (i)**, (i) to (x) which is bonded via one or more of its phenyl moieties to adjacent moieties

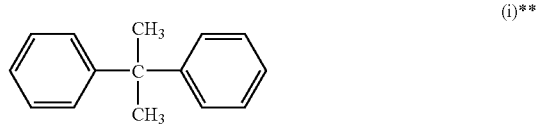

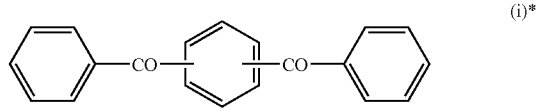

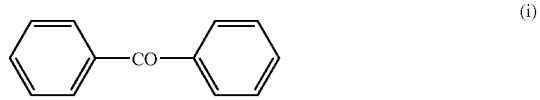

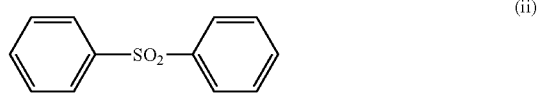

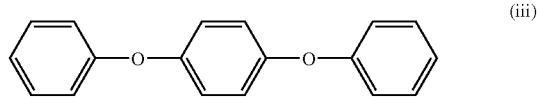

-continued (vi)

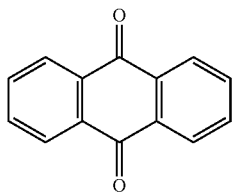

(vii)

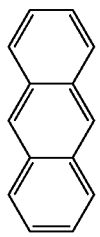

(viii)

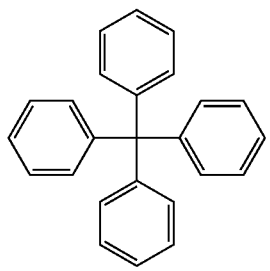

(ix)

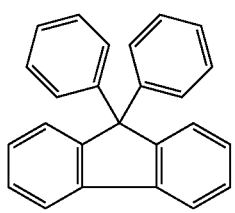

(x)

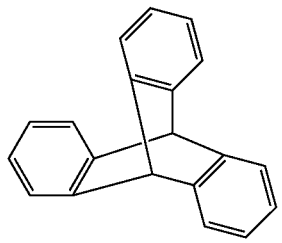

Unless otherwise stated in this specification, a phenyl moiety may have 1,4- or 1,3-, especially 1,4-, linkages to moieties to which it is bonded.

In (i)*, the middle phenyl may be 1,4- or 1,3-substituted.

Said polymeric material may include more than one different type of repeat unit of formula I; more than one different type of repeat unit of formula II; and more than one different type of repeat unit of formula III. Preferably, however, only one type of repeat unit of formula I, II and/or III is provided.

Said moieties I, II and III are suitably repeat units. In the polymeric material, units I, II and/or III are suitably bonded to one another—that is, with no other atoms or groups being bonded between units I, II, and III.

Where the phenyl moieties in units I, II or III are optionally substituted, they may be optionally substituted by one or more halogen, especially fluorine and chlorine, atoms or alkyl, cycloalkyl or phenyl groups. Preferred alkyl groups are $C_{1-10}$, especially $C_{1-4}$, alkyl groups. Preferred cycloalkyl groups include cyclohexyl and multicyclic groups, for example adamantyl.

Another group of optional substituents of the phenyl moieties in units I, II or III include alkyls, halogens, $C_yF_{2y+1}$ where y is an integer greater than zero, O-$R^q$ (where $R^q$ is selected from the group consisting of alkyls, perfluoralkyls and aryls), CF=$CF_2$, CN, $NO_2$ and OH. Trifluormethylated phenyl moieties may be preferred in some circumstances.

Preferably, said phenyl moieties are not optionally-substituted as described.

Where said polymeric material is cross-linked, it is suitably cross-linked so as to improve its properties. Any suitable means may be used to effect cross-linking. For example, where E represents a sulphur atom, cross-linking between polymer chains may be effected via sulphur atoms on respective chains. Preferably, said polymeric material is not optionally cross-linked as described.

Where w and/or z is/are greater than zero, the respective phenylene moieties may independently have 1,4- or 1,3-linkages to the other moieties in the repeat units of formulae II and/or III. Preferably, said phenylene moieties have 1,4-linkages.

Preferably, the polymeric chain of the polymeric material does not include a —S— moiety. Preferably, G represents a direct link.

Suitably, "a" represents the mole % of units of formula I in said polymeric material, suitably wherein each unit I is the same; "b" represents the mole % of units of formula II in said polymeric material, suitably wherein each unit II is the same; and "c" represents the mole % of units of formula III in said polymeric material, suitably wherein each unit III is the same. Preferably, a is in the range 45-100, more preferably in the range 45-55, especially in the range 48-52. Preferably, the sum of b and c is in the range 0-55, more preferably in the range 45-55, especially in the range 48-52. Preferably, the ratio of a to the sum of b and c is in the range 0.9 to 1.1 and, more preferably, is about 1. Suitably, the sum of a, b and c is at least 90, preferably at least 95, more preferably at least 99, especially about 100. Preferably, said polymeric material consists essentially of moieties I, II and/or III.

Said polymeric material may be a homopolymer having a repeat unit of general formula

IV

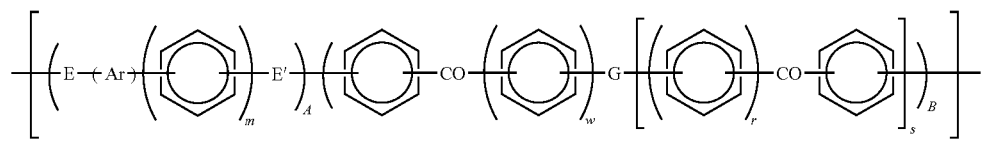

or a homopolymer having a repeat unit of general formula

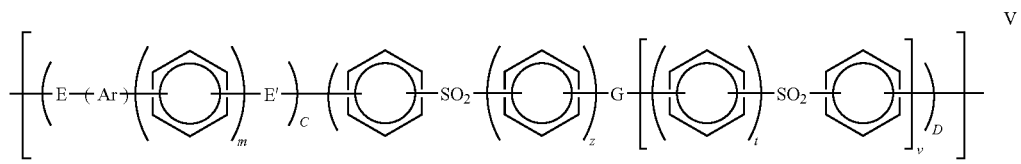
V or a random or block copolymer of at least two different units of IV and/or V wherein A, B, C and D independently represent 0 or 1 and E,E',G,Ar,m,r,s,t,v,w and z are as described in any statement herein.

As an alternative to a polymeric material comprising units IV and/or V discussed above, said polymeric material may be a homopolymer having a repeat unit of general formula

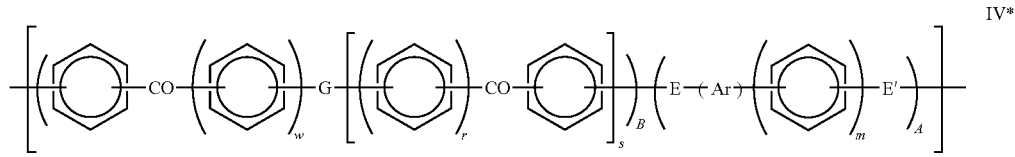
IV* or a homopolymer having a repeat unit of general formula

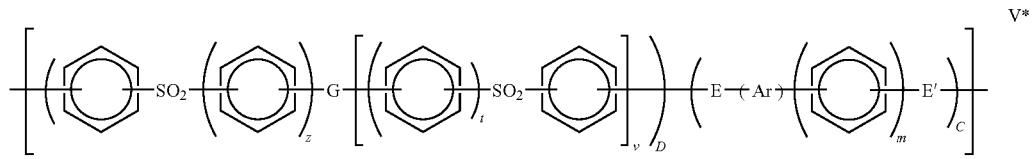
V* or a random or block copolymer of at least two different units of IV* and/or V*, wherein A, B, C, and D independently represent 0 or 1 and E, E', G, Ar, m, r, s, t, v, w and z are as described in any statement herein.

Preferably, m is in the range 0-3, more preferably 0-2, especially 0-1. Preferably, r is in the range 0-3, more preferably 0-2, especially 0-1. Preferably t is in the range 0-3, more preferably 0-2, especially 0-1. Preferably, s is 0 or 1. Preferably v is 0 or 1. Preferably, w is 0 or 1. Preferably z is 0 or 1.

Preferably, said polymeric material is a homopolymer having a repeat unit of general formula IV.

Preferably Ar is selected from the following moieties (xi)*, (xi)**, (xi) to (xxi):

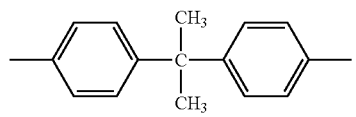
(xi)**

-continued

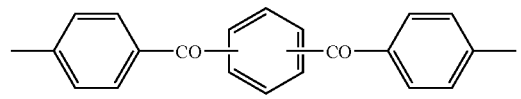
(xi)*

-continued

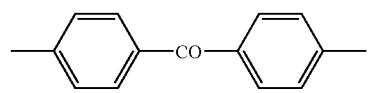
(xi)

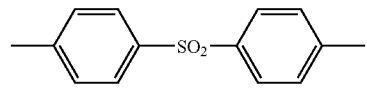
(xii)

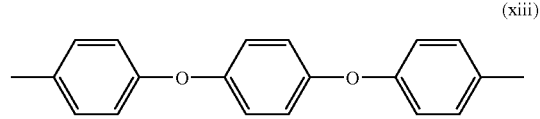
(xiii)

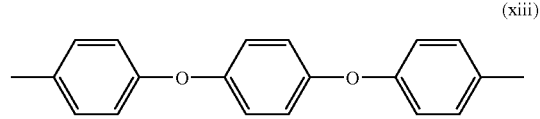
(xiv)

-continued

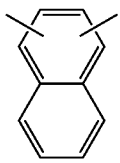
(xv)

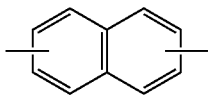
(xvi)

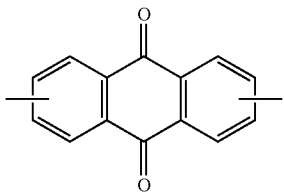
(xvii)

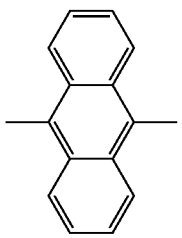
(xviii)

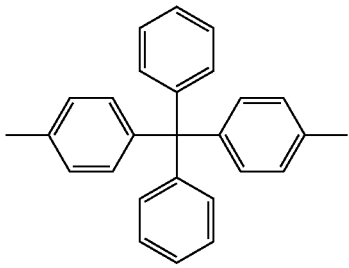
(xix)

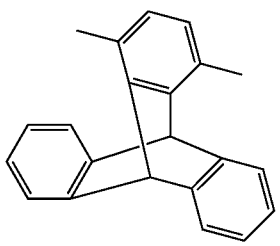
(xx)

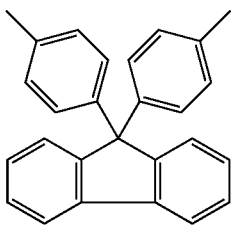
(xxi)

In (xi)*, the middle phenyl may be 1,4- or 1,3-substituted.

Preferably, (xv) is selected from a 1,2-, 1,3-, or a 1,5-moiety; (xvi) is selected from a 1,6-, 2,3-, 2,6- or a 2,7-moiety; and (xvii) is selected from a 1,2-, 1,4-, 1,5-, 1,8- or a 2,6-moiety.

One preferred class of polymeric material does not include any moieties of formula III, but suitably only includes moieties of formulae I and/or II. Where said polymeric material is a homopolymer or random or block copolymer as described, said homopolymer or copolymer suitably includes a repeat unit of general formula IV. Such a polymeric material may, in some embodiments, not include any repeat unit of general formula V.

Suitable moieties Ar are moieties (i)*, (i), (ii), (iii) and (iv) and, of these, moieties (i)*, (i) and (iv) are preferred. Other preferred moieties Ar are moieties (xi)*, (xii), (xi), (xiii) and (xiv) and, of these, moieties (xi)*, (xi) and (xiv) are especially preferred.

An especially preferred class of polymeric material are polymers (or copolymers) which consist essentially of phenyl moieties in conjunction with ketone and/or ether moieties. That is, in the preferred class, the polymeric material does not include repeat units which include —S— or aromatic groups other than phenyl. Preferred polymeric materials of the type described include:

(a) a polymer comprising units of formula IV wherein Ar represents moiety (iv), E and E' represent oxygen atoms, m represents 0, w represents 1, G represents a direct link, s represents 0, and A and B represent 1 (i.e. polyetheretherketone).

(b) a polymer comprising units of formula IV wherein E represents an oxygen atom, E' represents a direct link, Ar represents a moiety of structure (i), m represents 0, A represents 1, B represents 0 (i.e. polyetherketone);

(c) a polymer comprising units of formula IV wherein E represents an oxygen atom, Ar represents moiety (i)*, m represents 0, E' represents a direct link, A represents 1, B represents 0, (i.e. polyetherketoneketone).

(d) a polymer comprising units of formula IV wherein Ar represents moiety (i), E and E' represent oxygen atoms, G represents a direct link, m represents 0, w represents 1, r represents 0, s represents 1 and A and B represent 1. (i.e. polyetherketoneetherketoneketone).

(e) a polymer comprising units of formula IV, wherein Ar represents moiety (iv), E and E' represents oxygen atoms, represents a direct link, m represents 0, w represents 0, s, r, A and B represent 1 (i.e. polyetheretherketoneketone).

(f) a polymer comprising units of formula IV, wherein E represents an oxygen atom, E' represents a direct link, Ar represents a moiety of structure (ii), m represents 0, A represents 1, B represents 0 (i.e. polyethersulphone).

(g) a polymer comprising units of formula V, wherein E and E' represent oxygen atoms, Ar represents moiety (xi)**, m represents 0, z represents 1, G represents a direct link, V represents 0, C and D represent 1 (i.e. polysulphone).

(h) a polymer comprising units of formula IV, wherein Ar represents moiety (iv), E and E' represent oxygen atoms, m represents 1, w represents 1, A represents 1, B represents 1, r and s represent 0 and G represents a direct link (i.e. polyether-diphenyl-ether-phenyl-ketone-phenyl-).

Said polymeric material is preferably semi-crystalline. The level and extent of crystallinity in a polymer is preferably measured by wide angle X-ray diffraction (also referred to as Wide Angle X-ray Scattering or WAXS), for example as described by Blundell and Osborn (Polymer 24, 953, 1983). Alternatively, crystallinity may be assessed by Differential Scanning Calerimetry (DSC).

The level of crystallinity in said polymeric material may be at least 1%, suitably at least 3%, preferably at least 5% and more preferably at least 10%. In especially preferred embodiments, the crystallinity may be greater than 30%, more preferably 40%, especially 45%.

The glass transition temperature ($T_g$) of said polymeric material may be at least 140° C., suitably at least 144° C., preferably at least 154° C., more preferably at least 160° C., especially at least 164° C. In some cases, the Tg may be at least 170° C., or at least 190° C. or greater than 250° C. or even 300° C.

Said polymeric material may have an inherent viscosity (IV) of at least 0.1, suitably at least 0.3, preferably at least 0.4, more preferably at least 0.6, especially at least 0.7 (which corresponds to a reduced viscosity (RV) of least 0.8) wherein RV is measured at 25° C. on a solution of the polymer in concentrated sulphuric acid of density 1.84 gcm$^{-3}$, said solution containing 1 g of polymer per 100 cm$^{-3}$ of solution. IV is measured at 25° C. on a solution of polymer in concentrated sulphuric acid of density 1.84 gcm$^3$, said solution containing 0.1 g of polymer per 100 cm$^3$ of solution.

The measurements of both RV and IV both suitably employ a viscometer having a solvent flow time of approximately 2 minutes.

The main peak of the melting endotherm (Tm) for said polymeric material (if crystalline) may be at least 300° C.

Said polymeric material may consist essentially of one of units (a) to (h) defined above. Alternatively, said polymeric material may comprise a copolymer comprising at least two units selected from (a) to (h) defined above. Preferred copolymers include units (a). For example, a copolymer may comprise units (a) and (h); or may comprise units (a) and (e).

In preferred embodiments, said polymeric material is selected from polyetheretherketone and polyetherketone. In an especially preferred embodiment, said polymeric material is polyetheretherketone.

Referring to said surface active agent, one of the two remaining bonds of said carbonyl group of said surface active agent may be bonded to a carbon atom. Preferably, the other one of the two remaining bonds may be bonded to a carbon, nitrogen or oxygen atom. Thus, said carbonyl group of said surface active agent may be a ketone group or part of a carboxylate or imide moiety. Preferably, said carbonyl group of said surface active agent is part of a carboxylate moiety. The presence of an ether oxygen atom in such a moiety may facilitate interaction between the surface active agent and the polymeric material.

When the surface active agent includes a sulphone moiety, one of the two remaining bonds may be bonded to a carbon atom. Preferably, the other one of the two remaining bonds may be bonded to a carbon or nitrogen atom. More preferably, however, each of the two remaining bonds of said sulphone moiety are bonded to respective carbon atoms.

When said polymeric material includes carbonyl moieties, said surface active agent preferably includes a carbonyl moiety of the type described. When said polymeric material includes carbonyl and sulphone moieties, said surface active agent preferably includes a carbonyl moiety of the type described. When said polymeric material does not include any carbonyl moieties said surface active agent may include carbonyl or sulphone moieties of the type described.

Preferably, said surface active agent includes a carbonyl moiety and a hydrophilic group. Preferably, said surface active agent does not include a sulphone moiety except in a said hydrophilic group thereof.

Said surface active agent preferably includes a hydrophobic moiety. Said hydrophobic moiety preferably includes a carbon atom containing chain having at least 4, preferably at least 6, more preferably at least 7, especially at least 8 carbon atoms. The chain could be part of a cyclic moiety. Preferably, however, said carbon atom containing chain is linear or branched. Carbon atoms in said chain may be optionally substituted. Carbon atoms in the chain may define an optionally-substituted, preferably unsubstituted, alkyl group. Preferably, the only carbon atoms in said chain are ones which are saturated.

Said surface active agent preferably includes a $C_4$-$C_{16}$, preferably a $C_4$-$C_{12}$, more preferably a $C_4$-$C_{10}$ hydrophobic moiety. Said moiety is preferably aliphatic and linear or branched. Said moiety is preferably saturated.

Said surface active agent may include more than one hydrophobic moiety of the type described. Preferably, said surface active agent includes no more than two hydrophobic moieties. More preferably, it includes two hydrophobic moieties which are preferably spaced apart, at least in part, by other moieties (especially said carbonyl or sulphone moiety) of the surface active agent.

Said hydrophilic group may be selected from an ionic moiety and a non-ionic moiety.

When said hydrophilic group includes an ionic moiety, said hydrophilic group preferably includes cationic and anionic moieties. Said hydrophilic group preferably includes a —COO$^-$, a —SO$^-_3$— or a —PO$_3^{2-}$ moiety. An —SO$^-_3$— moiety may be a part of a sulphonate (e.g. where —SO$^-_3$— is bonded to a carbon atom) or part of a sulphate (i.e. —O—SO$_3^-$). A —PO$_3^{2-}$ moiety is preferably part of a phosphate (i.e. —OPO$_3^{2-}$).

Preferably, said hydrophilic group includes an —SO$_3^-$ (especially a sulphonate) moiety.

The hydrophilic group suitably includes an appropriate cationic moiety which may be selected from Group I and Group II metal ions. Sodium and potassium, especially sodium, are preferred cationic moieties.

Although the surfactant could include more than one ionic moiety of the type described it preferably includes a single said moiety.

Said hydrophilic group could be pendent from an aromatic, for example a phenyl moiety. Preferably, however, it is pendant from an aliphatic moiety.

When said hydrophilic group includes a non-ionic moiety, said moiety may include ether or hydroxy functional groups. Said hydrophilic group may include at least two spaced apart functional groups each of which may be independently selected from an ether and a hydroxy group. Said hydrophilic group may be selected from an alkylene oxy (for example ethyleneoxy or propyleneoxy, especially ethyleneoxy) moiety and an hydroxy group. Said hydrophilic group may include one or more alkyleneoxy or hydroxy groups.

Said surface active agent may have the general formula

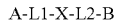

A-L1-X-L2-B wherein:

A represents a said hydrophobic moiety;
L1 represents a linking atom or group or a direct link;
X represents a said carbonyl or sulphone moiety;
L2 represents a linking atom or group or a direct link; and
B represents a said hydrophilic moiety.

A preferably represents a $C_4$-$C_{16}$ hydrophobic moiety as described above.

L1 may be a direct link in which case said hydrophobic moiety will be bonded directly to moiety X or may include an —O— moiety.

Preferably, L1 includes an —O— moiety. Such a moiety may be part of another moiety or L1 may consist of an —O— moiety.

In one embodiment, L1 may comprise a moiety of formula

—[O(CH$_2$)$_{n1}$]$_{m1}$—O— wherein:
n1 is in the range 1 to 4; and
m1 is in the range 0 to 5.

Preferably, n1 is 2; and m1 is in the range 0 to 3.
More preferably, m1 is 0.
X preferably represents a carbonyl moiety.
L2 preferably represents a linking or atom or group. L2 preferably spaces the hydrophilic moiety (e.g. —SO$_3^-$ moiety) from the carbonyl or sulphonyl moiety. L2 could be a phenyl moiety in which case the hydrophilic moiety may be pendent from one ring position of the phenyl moiety and X may be pendent from another ring position of the phenyl moiety. Preferably, however, L2 includes one or two (preferably only one) atom(s), (preferably one or two carbon atoms) arranged between the carbon or sulphur atoms of the carbonyl or sulphone moieties respectively and said hydrophilic moiety (e.g. the sulphur atom wherein the moiety is —SO$_3^-$).

L2 may include a carbonyl or sulphone moiety. This may increase the extent of compatibility between the surface active agent and polymeric material. Preferably, L2 includes a carbonyl moiety. L2 may include a hydrophobic moiety. Such a moiety may have any feature of the hydrophobic moiety described above, for example in the context of L1.

L2 may incorporate a moiety

A-L1-X- wherein A, L1 and X are as described above.

When said surface active agent has the general formula A-L1-X-L2-B as described and L2 incorporates a moiety A-L1-X- as described, preferably A, L1 and X represent the same respective atoms or groups in both A-L1-X-L2-B and A-L1-X.

L2 may incorporate a moiety

A-L1-X-L3 wherein L3 is a linking atom or group or a direct link.

Preferably, L3 is a linking group which may contain 1-5, preferably 1-3, especially 2, carbon atoms. L2 is preferably a saturated alkylyl radical.

Preferably, said surface active agent is of formula

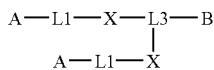

wherein each A, L1 and X may be the same or different, but are preferably the same. Preferably, in the formula, A is a C$_4$-C$_{16}$ hydrophobic moiety; L1 is an oxygen atom; X is a carbonyl group; L3 is a —(CH$_2$)$_{n3}$— moiety where n3 is 1 to 5, preferably 2; and B preferably includes a —SO$_3^-$ moiety. B may include a sodium or potassium cation.

Said surface active agent is suitably an alkyl sulphosuccinate, preferably a di-alkyl sulphosuccinate.

Said surface active agent may be selected from a di-octyl, a di-tridecyl, a di-isobutyl, a di-hexyl, a di-methylamyl, a diamyl and an isodecyl sulphosuccinate. The sodium salts of the aforesaid are preferred.

An especially preferred surface active agent is a di-octyl sulphosuccinate, especially sodium di-octyl sulphosuccinate.

Said aqueous dispersion may include at least 35 wt %, preferably at least 40 wt %, more preferably at least 45 wt %, especially at least 50 wt % of water.

Said dispersion may include less than 80 wt %, suitably less than 75 wt %, preferably less than 70 wt %, more preferably less than 65 wt %, especially less than 60 wt % water.

Said aqueous dispersion may include at least 1 wt %, suitably at least 2 wt %, preferably at least 2.5 wt %, more preferably at least 3 wt %, especially at least 3.5 wt % of said surface active agent.

Said aqueous dispersion may include less than 15 wt %, suitably less than 12 wt %, preferably less than 10 wt %, more preferably less than 8 wt %, especially less than 6 wt % of said surface active agent.

Said aqueous dispersion may include at least 10 wt %, suitably at least 15 wt %, preferably at least 20 wt %, more preferably at least 25 wt %, especially at least 30 wt % of polymeric material(s) as described in (B) of said first aspect.

Said aqueous dispersion may include less than 60 wt %, suitably less than 50 wt %, preferably less than 45 wt %, more preferably less than 40 wt % of polymeric material(s) described in (B).

Said aqueous dispersion may include more than one different type of polymeric material. For example, more than one different type of polymeric materials as described in (B) may be included. Optionally, said aqueous dispersion may include a second polymeric material of a different type compared to said material described in (B). The ratio of the wt % of said second polymeric material to the wt % of polymeric material(s) of the type described in (B) is preferably 1 or less. Said dispersion may include 0 to 20 wt % of a said second polymeric material, preferably 0 to 10 wt %.

A said second polymeric material may be a fluoropolymer.

Preferably, the only polymeric material(s) in said dispersion is/are of the type described in (B) of said first aspect.

Said polymeric material described in (B) may have a D$_{50}$ of less than 100 µm, preferably less than 60 µm, more preferably less than 40 µm, especially less than 20 µm. The D$_{50}$ may be greater than 1 µm.

D$_{50}$ referred to herein may be measured by laser diffraction, for example using a Sympatec Helos (HO476) RODOS Analyser with Windox Software from Sympatec GmbH, Germany.

Said aqueous dispersion may include a hydroxyl group containing material, for example a hydroxyl group containing solvent. Said aqueous dispersion may include 0 to 3 wt %, suitably 0 to 1.5 wt % of such a material. A said hydroxyl group containing material may include 1 to 6, preferably 1 to 4, especially 1 or 2 carbon atoms. Such a material is preferably saturated. Such a material preferably has a molecular weight of less than 120, preferably less than 100, more preferably less than 80, especially less than 60. Said material may include up to 3, preferably up to 2, more preferably only 1 hydroxyl group. Said material is preferably an alcohol, more preferably a monohydric alcohol. A C$_{1-3}$ alcohol, especially ethanol is preferred.

Said aqueous dispersion may include 0 to 10 wt %, suitably 0 to 5 wt % of other additives. Said other additives may be particulate and insoluble in the dispersion. Examples include glass particles, ceramic particles, metallic particles, carbon particles, mineral particles, and pigments. Specific examples of suitable particles include glass beads, glass microspheres, glass fibers, silica particles, random glass microfibers; carbon black, titanium dioxide particles, barium titanate particles, molybdenum disulphide and mica.

In a preferred embodiment, said aqueous dispersion comprises:
(A) 50 to 70 wt % water;
(B) 30 to 50 wt % polyetheretherketone or polyetherketone;

(C) 2 to 6 wt % of a surface active agent which includes a carboxylate moiety, an alkyl moiety and a sulphonate moiety.

According to a second aspect of the invention, there is provided an aqueous dispersion comprising:
(A) water;
(B) a polymeric material as described in (B) according to said first aspect (especially polyetheretherketone or polyetherketone), wherein said polymeric material has a $D_{50}$ of less than 100 μm (especially less than 50 μm); and
(C) a surface active agent as described in (C) according to said first aspect.

The aqueous dispersion of the second aspect may have any feature of the dispersion of the first aspect *mutatis mutandis*.

According to a third aspect of the invention, there is provided a method of preparing an aqueous dispersion comprising the steps of contacting water, a polymeric material and a surface active agent as described according to said first aspect.

The method preferably comprises contacting water and said surface active agent, preferably mixing these components, and subsequently contacting a mixture of water and said surface active agent with said polymeric material.

Said surface active agent selected for contact with water in the method may be part of a surface active agent formulation. Such a formulation may include said surface active agent and a hydroxyl group containing material as described according to said first aspect. The ratio of the wt % of said material to said surface active agent in the formulation may be in the range 0 to 0.2, preferably 0 to 0.15, especially 0 to 0.12. A said surface active agent formulation may include water, for example 10 to 25 wt %, for example 15 to 20 wt % water.

Preferably, contact of said water and said surface active agent is carried out at a temperature in the range 10 to 40° C., preferably 15 to 30° C., more preferably at ambient temperature. Preferably, contact of a said mixture of said water and surface active agent is carried out at a temperature in the range 10 to 40° C., preferably 15 to 30° C., more preferably at ambient temperature.

Preferably, said dispersion is preferably prepared by subjecting a mixture of water, said polymeric material and said surface active agent to high shear mixing.

According to a fourth aspect of the present invention, there is provided a method of coating a substrate, said method comprising contacting a substrate with an aqueous dispersion according to the first or second aspects or when prepared according to said third aspect.

Said substrate is preferably made out of a metal which is preferably selected from steel (including stainless steel), aluminium, and copper.

Said dispersion is preferably at a temperature in the range 10 to 40° C., preferably 15 to 30° C., more preferably at ambient temperature immediately prior to contact with said substrate.

Said substrate is preferably at a temperature in the range 10 to 40° C., preferably 15 to 30° C., more preferably at ambient temperature immediately prior to contact with said dispersion.

After contact of said substrate and aqueous dispersion, the method preferably includes the step of causing water to be removed from the dispersion on the substrate. Water is preferably caused to flash off. This may involve subjecting the substrate to an environment wherein the temperature is at least 100° C. and is preferably in the range 100° C. to 150° C.

After removal of water, said substrate with dispersion thereon is preferably subjected to a temperature arranged to cause the polymeric material to melt and flow. The substrate may be subjected to a temperature in the range 350° C. to 450° C.

In the method, a first coating layer may be prepared as described above having an average thickness of less than 100 μm, preferably less than 80 μm, more preferably less than 50 μm. The thickness may be at least 10 μm. The thickness is preferably in the range 15 to 40 μm.

The method may include the preparation of a second coating layer after preparation of the first coating layer. Preparation of the second coating layer may involve use of the steps described for preparation of said first coating layer. Said second coating layer may have a thickness as described for said first coating layer.

The method of said fourth aspect may be used to prepare a coating having an average thickness in the range 15 to 120 μm, preferably in the range 15 to 100 μm.

The method may be used to coat a substrate which may be immersed in a liquid in use. In this event, preferably, the part of the substrate which may be immersed is encapsulated in a said coating so that the part includes no edges of coatings which may be contacted with the liquid in use.

According to a fifth aspect of the present invention, there is provided a substrate coated in a method according to the fourth aspect. Preferably, the substrate has a coating of a thickness as described.

According to a sixth aspect of the present invention, there is provided a coating comprising a polymeric material as described in (B) of said first aspect; and the residue of a surface active agent described in (C) of said first aspect.

Any feature of any aspect of any invention or embodiment described herein may be combined with any feature of any aspect of any other invention or embodiment described herein *mutatis mutandis*.

Specific embodiments of the invention will now be described, by way of example.

The following are referred to hereinafter:
PEEK D150UF10 (Trade Mark)—polyetheretherketone powder having a $D_{50}$ of 9.6 μm obtained from Victrex Plc, UK.
PEEK 150XF (Trade Mark)—polyetheretherketone powder having a $D_{50}$ of 25 μm obtained from Victrex Plc, UK.
PEEK D450UF10 (Trade Mark)—polyetheretherketone powder having a $D_{50}$ of 10 μm obtained from Victrex Plc, UK.
PEEK HT (Trade Mark)—polyetherketone powder having a $D_{50}$ of 10 μM.
Aerosol® OT75% E—a surfactant from Cytec Industries UK Ltd comprising a mixture of sodium dioctyl sulphosuccinate (73-75% wt), ethanol (6-7% wt) and water.

Aqueous dispersions of polymers were prepared as described in examples 1 to 6.

EXAMPLE 1

A plastic 5000 ml beaker was charged with demineralised water (1.45 kg) and to it was added slowly, with stirring the surfactant, Aerosol OT75 E (100 g). When the mixture was homogeneous PEEK D150UF10 polymer (1 kg) was added slowly. Stirring was continued until the polymer had been fully incorporated.

The beaker was placed under a high shear Silverson laboratory mixer with an emulsion head stirrer attachment. The speed of the mixer was slowly increased to 3000 rpm and maintained at that speed for 5 minutes. There was minimal foaming of the sample.

The dispersion was poured into four 500 ml glass jars. After 72 hours the dispersion showed excellent stability, there were no signs of separation.

EXAMPLE 2

The procedure of Example 1 was repeated except the quantity of Aerosol OT75 was increased from 100 g to 130 g and PEEK D150UF10 polymer (1 kg) was replaced by PEEK 150XF polymer (1 kg).

The dispersion was poured into four 500 ml glass jars. After 72 hours the dispersion showed excellent stability; there were no signs of separation.

EXAMPLE 3

The procedure of Example 1 was repeated except the quantity of Aerosol OT75 was increased from 100 g to 130 g and PEEK D150UF10 polymer (1 kg) was replaced by PEEK D450UF10 polymer (1 kg).

The dispersion was poured into four 500 ml glass jars. After 72 hours the dispersion showed excellent stability; there were no signs of separation.

EXAMPLE 4

The procedure of Example 1 was repeated except PEEK D150UF10 polymer was replaced by PEEK HT D220UF10 polymer.

The dispersion was poured into four 500 ml glass jars. After 72 hours the dispersion showed excellent stability; there were no signs of separation.

EXAMPLE 5

The procedure of Example 1 was repeated except the quantity of surfactant Aerosol OT75 was varied, details are given in Table 1 below.

TABLE 1

| Example | Quantity of Aersol OT 75 (g) | Addn Surfactant to water | Addn of PEEK | Initial stability after 72 hours |
|---|---|---|---|---|
| 1 | 100 | Good | Good | Good |
| 5a | 130 | Good | Good | Good |
| 5b | 75 | Good | Good | Good |

EXAMPLE 6

Aqueous Dispersion of Polyetheretherketone and PFA

The procedure described in Example 1 was repeated except varying quantities of PFA were added. Details are given in Table 2 below.

TABLE 2

| Example | PFA wt %[a] | Ease of Incorporating | Initial Stability |
|---|---|---|---|
| 6a | 10% | Easily Incorporated | Good |
| 6b | 15% | Easily Incorporated | Good |
| 6c | 20% | Easily Incorporated | Good |

[a] based on the weight of PEEK.

Example 7 describes the results of coating trials.

EXAMPLE 7A

Coating Trials

The coating gun used was a Binks Bullows, type 630, with a tip size of 0.06. Air pressure to the gun was 30 to 40 psi depending on what type of coating was required (e.g. thin or thick). Substrates for coating were 2 mm thick×75 mm×75 mm square mild steel plaques. The plaques were degreased using trichloroethylene vapour and then grit blasted using aluminum oxide.

All the dispersion samples for the trial were hand mixed with a stirrer rod before pouring into the spray gun reservoir.

The plaques were placed in an air extracted spraying cabinet and a wet coat applied. The coated plaque was then placed in an oven for 5 minutes set to 100° C. to flash off the water. The plaques were left for 10 minutes in an oven set to 390° C. to melt and flow the coating.

After removal from the oven the plaques were forced cooled with an air gun which causes the polymeric material used to crystallise before applying a second wet coat. The second coat was allowed to "flow out" a second time in the oven and then cooled to room temperature.

Coatings prepared were subsequently visually evaluated for smoothness and defects. Details are given in Table 3 below.

TABLE 3

| Example | Example no. of dispersion used: | 1$^{st}$ Coat | 2$^{nd}$ Coat | Surface Finish after cooling | Other observations |
|---|---|---|---|---|---|
| 7a | Example 1 | X | X | Smooth surface. Slight orange peel | Easy to disperse no settlement |
| 7b | Example 2 | X | X | Smooth surface. Slight orange peel | Easy to disperse no settlement |
| 7c | Example 3 | X | X | Smooth surface. | Easy to disperse no settlement |
| 7d | Example 4 | X | X | Smooth surface. | Easy to disperse no settlement |
| 7e | Example 6a | X | X | Smooth surface. Very slight mottling | Easy to disperse no settlement |
| 7f | Example 6b | X | X | Smooth surface. Very slight mottling | Easy to disperse no settlement |
| 7g | Example 6c | X | X | Smooth surface. Very slight mottling | Easy to disperse no settlement |

EXAMPLE 8

Wear Resistance and Coefficient of Friction

The Wear Resistance and Coefficient of Friction of the coated substrates from Examples 7b and 7f were compared to substrates coated with other polymers, namely ECTFE, PTFE and PPS, details of which are provided below. Results are given in Table 4 below.

(1) ECTFE Coating
Manufacturer: Solvay/Solexis formerly Ausimont USA
Product Name/Number:
Halar 6614 Primer (Electrostatic Powder Coating):
Copolymer of Ethylene, Chlorotrifluoroethylene, and Hexafluoroisobutylene: Approx. Weight % 71-73%

| | |
|---|---|
| Cobaltic-Cobaltous Oxide | 1-4% |
| Wollastonite | 7-15% |
| Chromic oxide | 1-3% |
| Titanium Dioxide | 0.25-1.25% |
| Epoxy Resins | 5-20% |

Halar 6014 Topcoat (Electrostatic Powder Coating):
Copolymer of Ethylene, Chlorotrifluoroethylene, and Hexafluoroisobutylene: Approx. weight % 100%
(2) PTFE Coating (Liquid Dispersion Coating):
 Manufacturer: Whitford Corporation
 Product Name/Number: Xylan 1052/880
 Composition: 5.4% PTFE w/3.25% MOS2 in a Polyamide-Imide Binder
(3) PPS Coating (Electrostatic Powder Coating):
 Manufacturer: Whitford Corporation
 Product Name/Number: Dykor 860/PPS Powder Blend
 Composition: PPS (Polyphenylene Sulfide) and Titanium Dioxide as a filler.

TABLE 4

| Coated sample | Wear Index Taber Abrasion ASTM D4060-01 CS10 wheel 1000 g, 2000 cycles | Coefficient of Friction (COF) ASTM G133-95 (Plint Test) test at 250N | Notes for COF test |
|---|---|---|---|
| Example 7b | 0.75 | 0.21 | passed |
| Example 7f | 3.5 | 0.13 | passed |
| ECTFE | 6.7 | 0.283 | failed in 7 minutes |
| PTFE | 7.8 | 0.18 | failed in 15 sec |
| PPS | 24.7 | 0.19 | failed in 1 minute |

Coatings of the type described having a thickness in the range 15-100 μm may be prepared in the manner described above. The thicker coatings may be prepared by multiple passes wherein each pass builds up a layer which is 15-40 μm thick. Advantageously, the use of dispersions allows most complex geometries to be coated and is found to provide superior coverage, compared to other possible techniques, around holes, deep draws and recesses.

Coatings of the type described have been found to have superior lubricity and abrasion resistance compared to most other thermoplastic coatings.

Additionally, coatings of the type described have excellent bond strength and adhesion properties.

When coatings of the type described are applied to substrates or parts thereof which are immersed in solvent in use, it is preferred to completely encapsulate the part which is immersed to minimise the risk of delamination.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:
1. An aqueous dispersion comprising:
 (A) water;
 (B) a polymeric material which is a homopolymer having a repeat unit of general formula

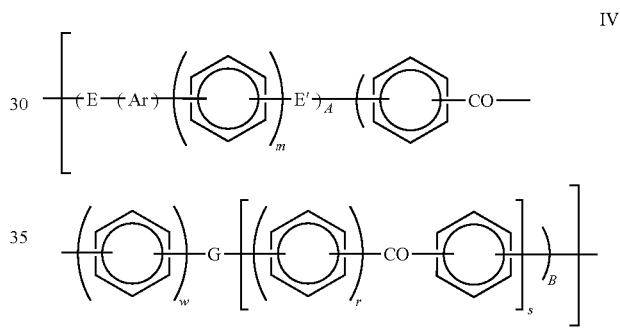

IV and selected from the following:
 (a) a polymer comprising units of formula IV wherein Ar represents moiety (iv), E and E' represent oxygen atoms, m represents 0, w represents 1, G represents a direct link, s represents 0, and A and B represent 1;
 (b) a polymer comprising units of formula IV wherein E represents an oxygen atom, E' represents a direct link, Ar represents a moiety of structure (i), m represents 0, A represents 1, B represents 0;
 (c) a polymer comprising units of formula IV wherein E represents an oxygen atom, Ar represents moiety (i)*, m represents 0, E' represents a direct link, A represents 1, B represents 0;
 (d) a polymer comprising units of formula IV wherein Ar represents moiety (i), E and E' represent oxygen atoms, G represents a direct link, m represents 0, w represents 1, r represents 0, s represents 1 and A and B represent 1;
 (e) a polymer comprising units of formula IV wherein Ar represents moiety (iv), E and E' represents oxygen atoms, G represents a direct link, m represents 0, w represents 0, s,r,A and B represent 1;
 (f) a polymer comprising units of formula IV wherein Ar represents moiety (iv), E and E' represent oxygen atoms, m represents 1, w represents 1, A represents 1, B represents 1, r and s represent 0 and G represents a direct link, wherein moiety (i)* is of structure

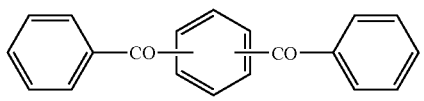 (i)* moiety (i) is of structure

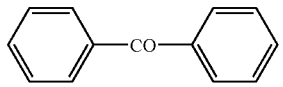 (i)

and moiety (iv) is of structure

 (iv)

wherein said polymeric material has an inherent viscosity (IV) of at least 0.6 and is semi-crystalline; and (C) a surface active agent of the general formula A-L1-X-L2-B, wherein A represents a hydrophobic moiety; L1 represents a linking atom or group or a direct link; X represents a carbonyl or sulphone moiety; L2 represents a linking atom or group or a direct link; and B represents a hydrophilic moiety where said hydrophilic group is an ionic moiety.

2. A dispersion according to claim 1, wherein said polymeric material is a polymer or copolymer which consists of phenyl moieties in conjunction with ketone and ether moieties.

3. A dispersion according to claim 1, wherein said polymeric material is selected from polyetheretherketone and polyetherketone.

4. A dispersion according to claim 1, wherein one of the two remaining bonds of said carbonyl group of said surface active agent is bonded to a carbon atom.

5. A dispersion according to claim 4, wherein the other one of the two remaining bonds is bonded to a carbon, nitrogen or oxygen atom.

6. A dispersion according to claim 1, wherein said carbonyl group of said surface activate agent is a ketone group or part of a carboxylate or imide moiety.

7. A dispersion according to claim 1, wherein said carbonyl group of said surface active agent is part of a carboxylate moiety.

8. A dispersion according to claim 1, wherein the surface active agent includes a sulphone moiety, and one of the two remaining bonds is bonded to a carbon atom and the other one of the two remaining bonds is bonded to a carbon or nitrogen atom.

9. A dispersion according to claim 1, wherein said surface active agent includes a carbonyl moiety and a hydrophilic group.

10. A dispersion according to claim 1, wherein said surface active agent includes a hydrophobic moiety which includes a carbon atom containing chain having at least four carbon atoms.

11. A dispersion according to claim 10, wherein said carbon atom containing chain is linear or branched.

12. A dispersion according to claim 10, wherein the only carbon atoms in said chain are ones which are saturated.

13. A dispersion according to claim 1, wherein said surface active agent includes a $C_4$-$C_{16}$ hydrophobic moiety.

14. A dispersion according to claim 1, wherein said surface active agent includes more than one hydrophobic moiety.

15. A dispersion according to claim 1, wherein said hydrophilic group includes cationic and anionic moieties.

16. A dispersion according to claim 1, wherein said hydrophilic group includes a $—COO^-$, a $—SO^-_3—$ or a $—PO_3^{2-}$ moiety.

17. A dispersion according to claim 1, wherein said hydrophilic group includes an $—O—SO_3^-$ moiety.

18. A dispersion according to claim 1, wherein said surface active agent is of formula:

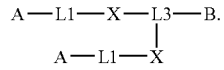

wherein each A, L1 and X is the same or different and L3 is a linking atom or group.

19. A dispersion according to claim 18, wherein A is a $C_4$-$C_{16}$ hydrophobic moiety; L1 is an oxygen atom; X is a carbonyl group; L3 is a linking atom or group and B includes a $—SO_3^-$ moiety.

20. A dispersion according to claim 1, wherein said surface active agent is an alkyl sulphosuccinate.

21. A dispersion according to claim 1, wherein said surface active agent is a di-octyl sulphosuccinate.

22. A dispersion according to claim 21, which comprises:
   (A) 50 to 70 wt % water;
   (B) 30 to 50 wt % semi-crystalline polyetheretherketone; and
   (C) 2 to 6 wt % of a surface active agent which is a di-octyl sulphosuccinate.

23. A dispersion according to claim 22, wherein the $D_{50}$ of the polyetheretherketone is less than 50 μm.

24. A dispersion according to claim 1, wherein said dispersion includes at least 35 wt % water and less than 80 wt % water.

25. A dispersion according to claim 1, which includes at least 10 wt % of polymeric materials as described in (B) and less than 60 wt % of polymeric materials described in(B).

26. A dispersion according to claim 1, wherein said polymeric material has a $D_{50}$ of less than 100 μm and greater than 1 μm.

27. A dispersion according to claim 1, which comprises:
   (A) 50 to 70 wt % water;
   (B) 30 to 50 wt % polyetheretherketone or polyetherketone;
   (C) 2 to 6 wt % of a surface active agent which includes a carboxylate moiety, an alkyl moiety and a sulphonate moiety.

28. A dispersion according to claim 27, which comprises:
   (A) 50 to 70 wt % water;
   (B) 30 to 50 wt % semi-crystalline polyetheretherketone; and
   (C) 2 to 6 wt % of a surface active agent which includes a carboxylate moiety, an alkyl moiety and a sulphonate moiety.

29. A dispersion according to claim 28, wherein the $D_{50}$ of the polyetheretherketone is less than 50 μm.

30. A method of preparing an aqueous dispersion comprising the steps of contacting water, a polymeric material and a surface active agent each being as described in claim 1.

31. A method of coating a substrate, said method comprising contacting a substrate with an aqueous dispersion according to claim 1.

32. A substrate coated in a method according to claim 31.

33. A coating comprising a polymeric material as described in claim 1; and the residue of a surface active agent as described in claim 1.

34. A dispersion which comprises:
A) at least 45 wt % and less than 70 wt % water
B) at least 25 wt % and less than 50 wt % semi-crystalline polyetheretherketone; and
C) at least 2 wt % and less than 10 wt % of a surface active agent which includes a carboxylate moiety, an alkyl moiety and a sulphonate moiety.

35. A dispersion according to claim 34, wherein said polyetheretherketone has an inherent viscosity of at least 0.6.

36. A dispersion which comprises:
A) at least 45 wt % and less than 70 wt % water
B) at least 25 wt % and less than 50 wt % semi-crystalline polyetheretherketone; and
C) at least 2 wt% and less than 10 wt % of a surface active agent which is a di-octyl sulphosuccinate.

* * * * *